Sept. 28, 1943.  H. A. NELSON  2,330,611
REVERSE TWIST BARBWIRE MACHINE
Filed May 8, 1942  10 Sheets-Sheet 3

Inventor:
HENRY A. NELSON,
by: John E. Jackson
his Attorney.

Sept. 28, 1943. H. A. NELSON 2,330,611
REVERSE TWIST BARBWIRE MACHINE
Filed May 8, 1942 10 Sheets-Sheet 6

Inventor:
HENRY A. NELSON,
by: John E. Jackson
his Attorney.

Sept. 28, 1943. H. A. NELSON 2,330,611
REVERSE TWIST BARBWIRE MACHINE
Filed May 8, 1942 10 Sheets-Sheet 10

Inventor:
HENRY A. NELSON,
by: John E. Jackson
his Attorney.

Patented Sept. 28, 1943

2,330,611

UNITED STATES PATENT OFFICE 2,330,611

REVERSE TWIST BARBWIRE MACHINE

Henry A. Nelson, De Kalb, Ill.

Application May 8, 1942, Serial No. 442,245

22 Claims. (Cl. 140—65)

The present invention relates to improvements in mechanism for the manufacture of barbwire in which adjacent portions of parallel strands are oppositely twisted.

In my prior Patent No. 2,254,238, issued September 2, 1941, I have disclosed and broadly claimed a method of manufacturing barbwire which involves providing a plurality of parallel strands, at least some of which carry barbs, and simultaneously twisting spaced portions thereof in opposite directions. Said prior patent also discloses and claims the method of manufacturing barbwire which comprises providing a plurality of strands, applying two barbs to one strand at predetermined spaced intervals, applying barbs to another strand approximately midway between those applied to the first mentioned strand, juxtaposing the strands and then simultaneously twisting the portions of the strands intermediate adjacent barbs in reverse directions.

The machine embodying the claimed invention of the present application is pecularily well suited for making barbwire in accordance with the method disclosed in my aforesaid prior patent.

The object of the present invention is to provide, combine and coordinate the various instrumentalities hereinafter disclosed in detail in such manner that they individually and collectively perform the various functions set forth.

For a complete understanding of the invention, reference is to be made to the following detail disclosure, the accompanying drawings, and the appended claims.

In the drawings:

Figure 14ª is a detail of the shear actuating mechanism;

Figure 1:
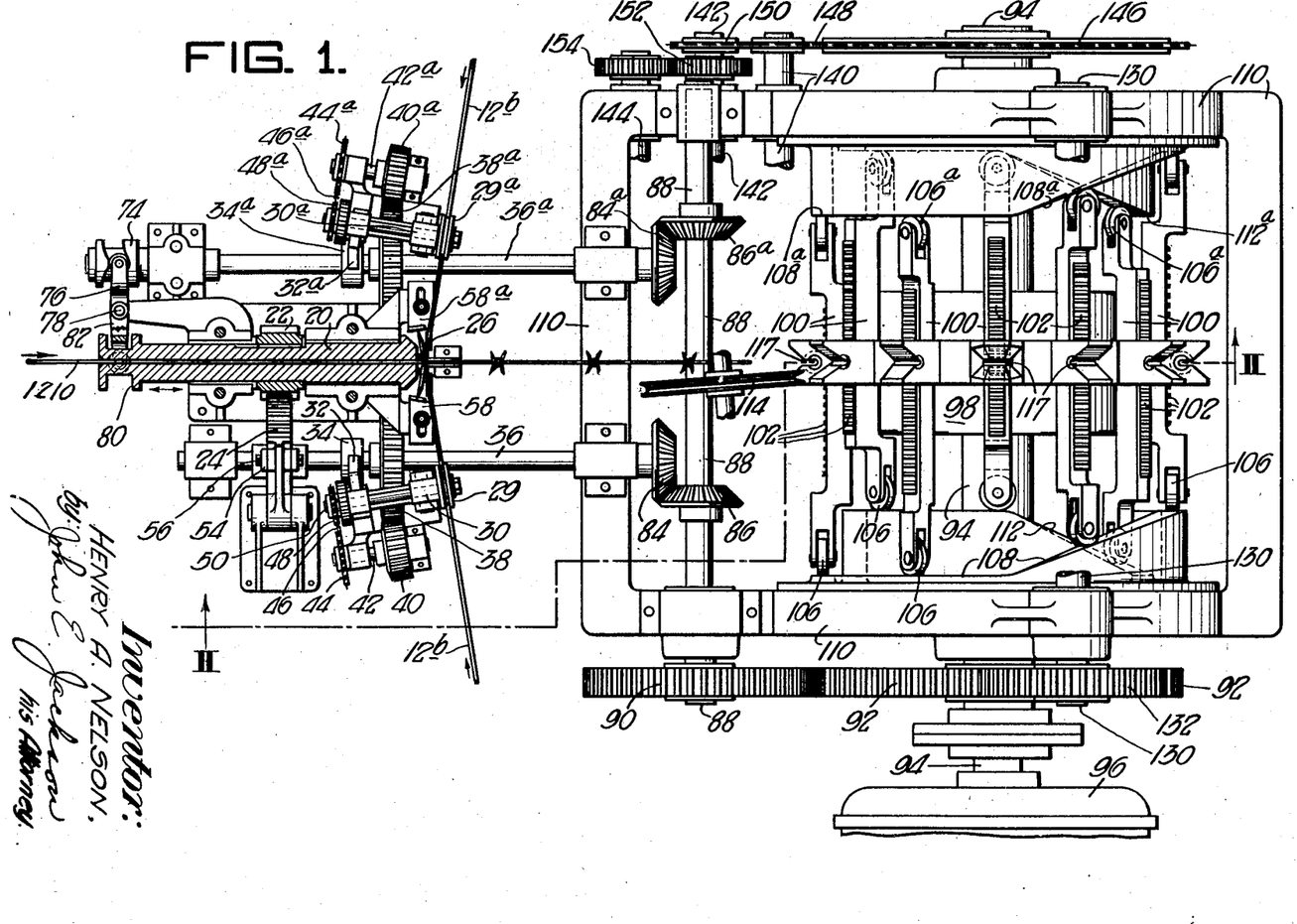
Figure 1 is a general plan view of a machine embodying the invention with portions shown in horizontal section in the interest of clearness.
Figure 7:
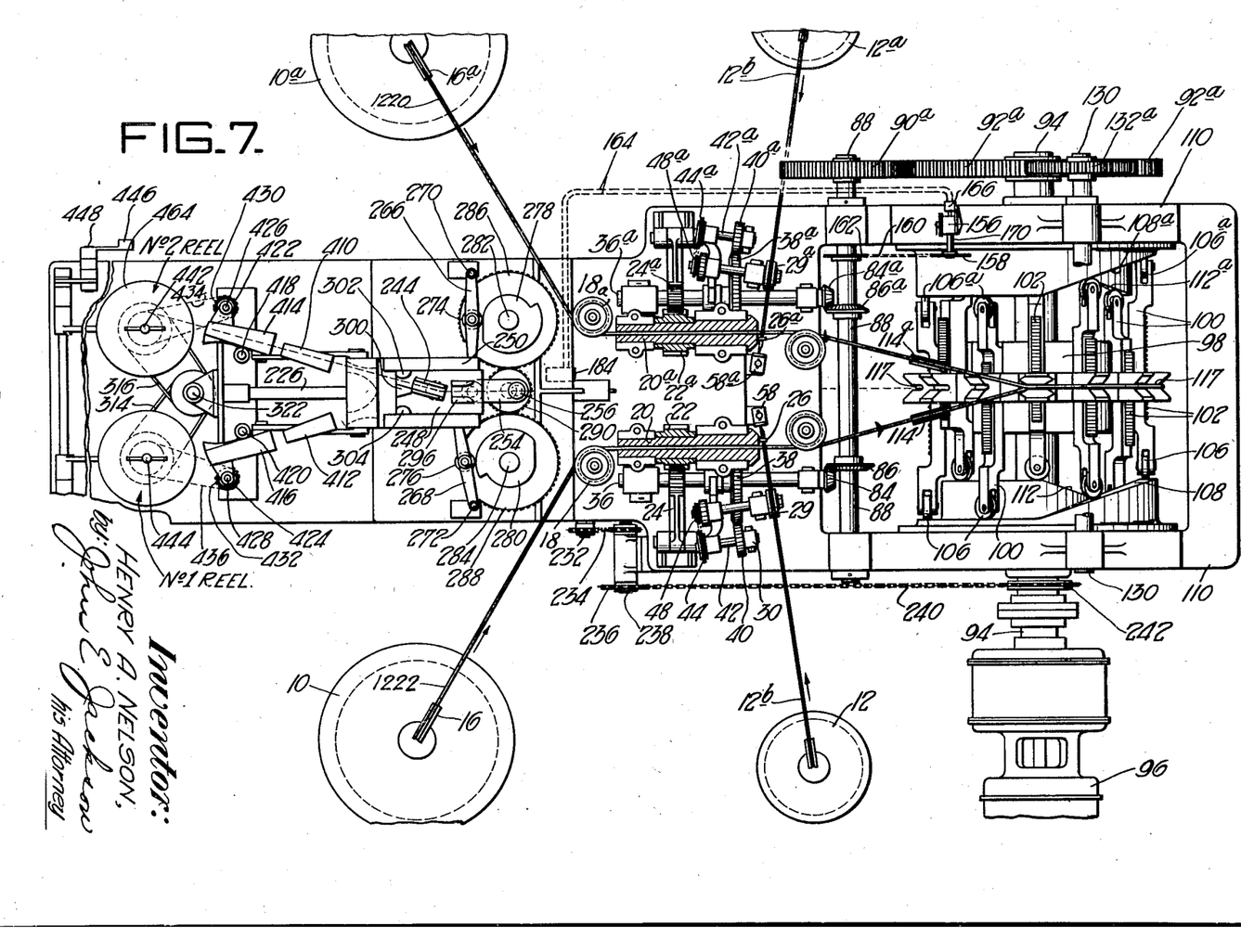
Figure 7 is a plan view illustrative of a means for feeding strand material from separate sources to operating zones arranged in parallel relation to which zones respective barbs are applied to the parallel strands.

In the accompanying drawings two alternative embodiments of the invention are illustrated in plan in Figures 1 and 7. In the machine of Figure 1 barbs are applied to one strand only of a line wire while in the machine of Figure 7, barbs are applied to both of the parallel line wires. Thus, before the wires are intertwisted, the line wires for Figure 1 correspond to the arrangement shown diagrammatically in Figure 9, while the line wires made by the machine of Figure 7 correspond to those shown in Figure 11. Similar underlying principles of operation are inherent in the machines of Figures 1 and 7, as will be apparent from the following detailed disclosure. The principal difference between the machines shown in Figures 1 and 7 is that in the machine of Figure 1 only one barbing mechanism is utilized, whereas in the machine of Figure 7 two barbing mechanisms are employed, one of which applies barbs to one of the juxtaposed strands while the other applies barbs to the other juxtaposed strands.

Figure 10:
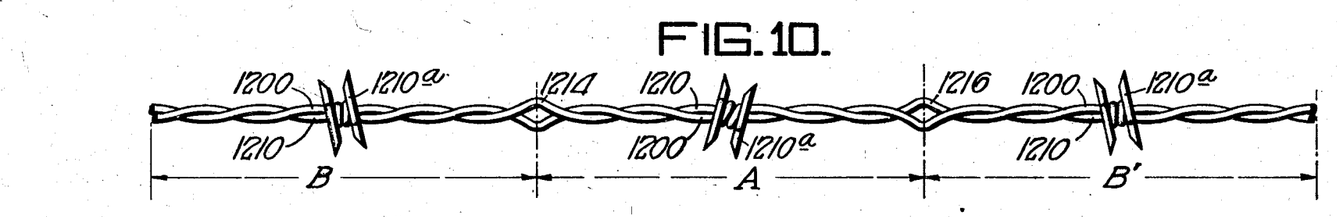
Figure 10 is a view of a completed length of barbwire made from strands such as shown in Figure 9 by the mechanism shown in Figure 1.
Figure 12:
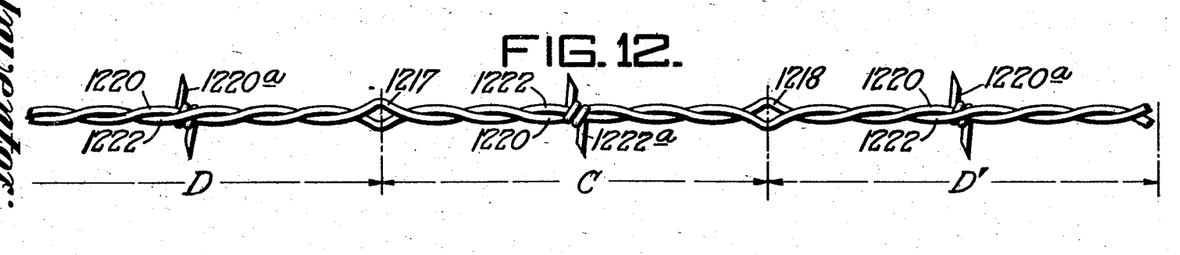
Figure 12 is a view illustrating the finished barbwire product made from the strands such as shown in Figure 11 by the mechanism illustrated in Figure 7.

The product made on the machine of Figure 1 is shown in Figure 10, while the product made on the machine of Figure 7 is shown in Figure 12. The difference between these two products obviously is that in one, barbs are applied to only one strand, and in the other, barbs are applied to both strands. The identical mechanism is used for reversely twisting the strands at points between the barbs.

Figure 9:
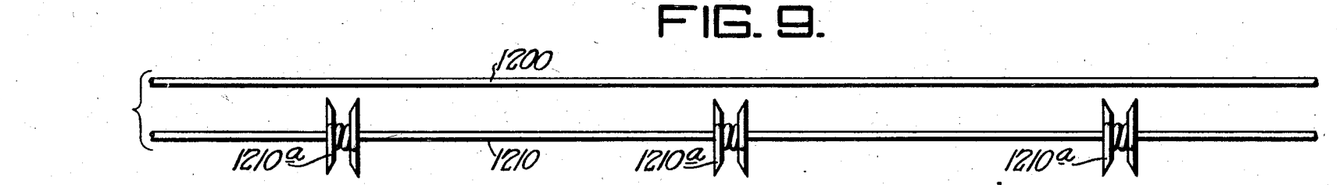
Figure 9 diagrammatically illustrates a pair of juxtaposed strand or line wires, one of which has barbs applied thereto at spaced intervals by the mechanism shown in Figure 1.
Figure 11:
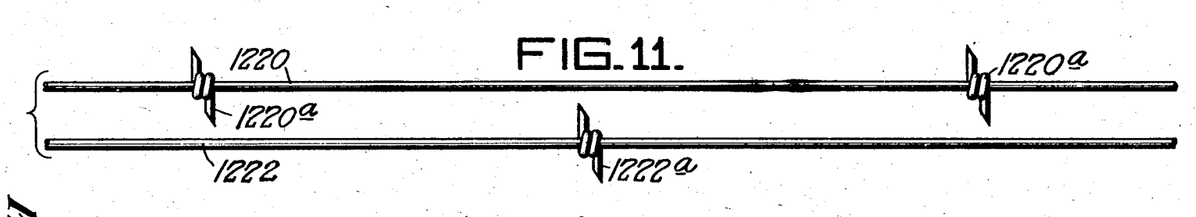
Figure 11 is a diagrammatic view of a pair of juxtaposed strand wires, both of which have barbs applied thereto, the barbs on one strand of wire being applied about midway between those on another wire, these barbs having been applied by the mechanism illustrated in Figure 7.

Before describing the mechanism in detail, it will be observed that the machine of Figure 1 is arranged to advance parallel strands, such as 1200 and 1210 shown in Figure 9. At spaced intervals barbs 1210$^a$ are applied to the strand 1210. The machine of Figure 1 is effective to engage the juxtaposed strands with twisting mechanisms at timed intervals in a manner that will hereinafter more fully appear. Thus the machine of Figure 1 will produce the product shown in Figure 10 in which a number of sections, such as shown at A, will be twisted in one direction, whereas a plurality of other sections, as indicated at B, will be twisted in a reverse direction. In this product of Figure 10, all of the barbs are secured to the strand 1210. In the machine of Figure 7, the twisting is identically the same, the difference being that the parallel strands 1220 and 1222 as shown in Figure 11 have respective barbs 1220$^a$ and 1222$^a$ secured thereto at annularly spaced intervals. Thus the twisting mechanism of exactly the same type used to make the product of Figure 10 comes into play to twist a plurality of portions such as indicated at C in Figure 12 in one direction and a plurality of other sections such as indicated at D and D' in Figure 12 in the reverse direction.

Referring in detail first to Figure 7 of the drawings, the numerals 10 and 10$^a$ represent supply reels for the line or strand wire from which the barbwire product is made. The numerals 12 and 12$^a$ represent supply reels from which the stock is fed which forms the barbs. To avoid confusion with the term barbwire, which normally refers to the completed product, the wire stock fed from the barb forming wire reels 12 and 12$^a$ will herein be referred to as barb stock. This barb stock is, of course, formed of wire and it is indicated in the drawings as 12$^b$—12$^b$. The line wires in the drawings are indicated at 1222 and 1220. In the machine of Figure 7, barb stock is applied to both strands 1222 and 1220 while in the machine of Figure 1 barb stock is applied only to one of the strands or line wires.

For simplification of illustration, in the machine of Figure 7 there is shown a single piece of barb stock coiled around each strand 1222 and 1220. This will produce double-pointed barbs at spaced intervals on each strand wire. In the machine of Figure 1 the barb stock is fed from each side of the machine toward the centrally located advancing strand wire, thus two double-pointed barbs are coiled at spaced intervals to produce the four-point barbs illustrated.

In general, both embodiments of the invention will include certain fundamental stations. These are the strand supply stations, the barb stock supply stations, the barb coiling station, the strand twisting station, the pull-out station, the flying shear, for cutting the finished product after a predetermined length thereof has been processed, and the take-up station which alternately receives and coils up the finished product.

Referring to Figure 7, the line or strand wire is fed from the reels 10 and 10$^a$ over swiveled guide sheaves 16 and 16$^a$. The fixed sheaves 18 and 18$^a$ guide the strand wire to the central bores of coiling turrets 20 and 20$^a$. These turrets carry gears 22 and 22$^a$ which are actuated by sectors 24 and 24$^a$ which are effective to rapidly rotate the turrets so as to impart a rotary motion to barb-applying pins 26 and 26$^a$ which are mounted concentric to the center bores of the coiling turrets.

The barb-applying pins, upon rotation of the turrets, are effective to coil the barb stock around the advancing strand wires. The barb stock is periodically fed transversely across the line of travel of the advancing strand wire stock by means of coacting pairs 28 and 29, and 23$^a$ and 29$^a$, of pinch rolls.

Figures 2, 3, 4, 8:
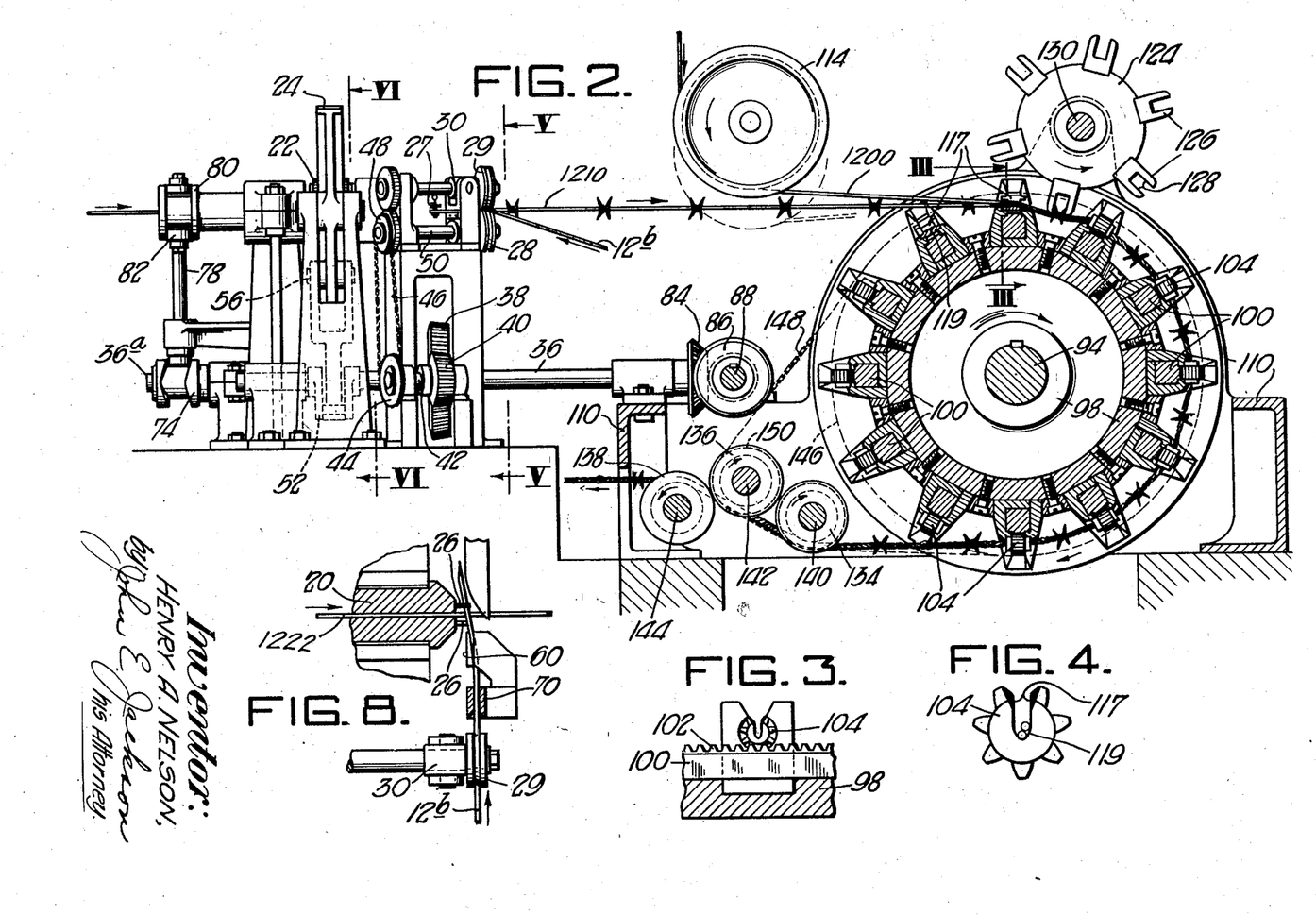
Figure 2 is a vertical sectional elevation taken approximately on the staggered line II—II of Figure 1.
Figure 3 is a detail view of a strand twister taken on line III—III of Figure 2.
Figure 4 is an enlarged detail section of one of the strand twister elements.
Figure 8 is a detail view of the barb applying and cutting mechanism.
Figure 6:
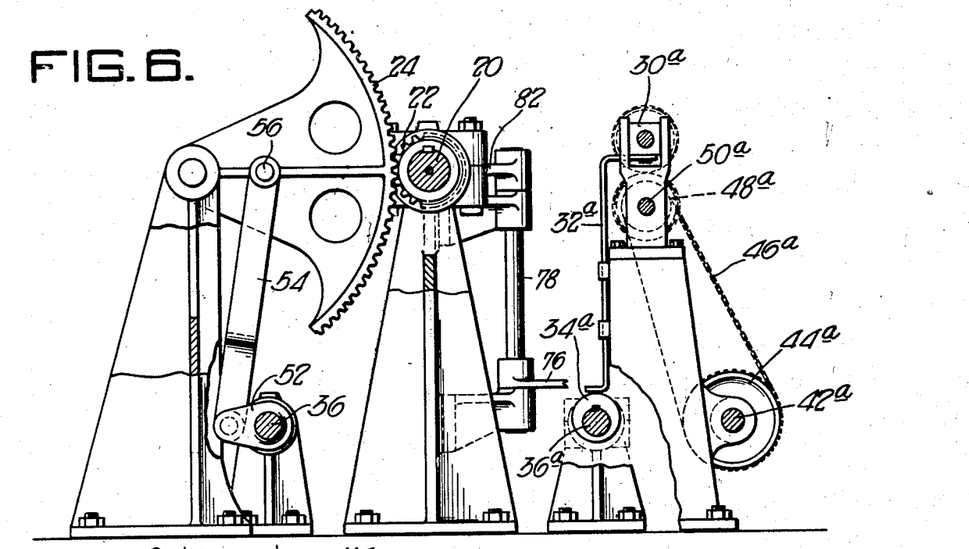
Figure 6 is a transverse vertical section on line VI—VI of Figure 2 illustrating the drive for the barb forming mechanism shown in Figure 5.

The pinch rolls 28 and 28$^a$ are mounted in fixed bearings, while the pinch rolls 29 and 29$^a$ are mounted in vertically adjustable bearings 30—30$^a$ such as shown in Figures 2 and 6. The vertically adjustable bearings 30 and 30$^a$ are slidably mounted, as illustrated in Figure 6, in forked extensions of the bearings for the rolls 28 and 28$^a$. For periodically elevating the upper pinch rolls 29—29$^a$, slides such as shown at 32$^a$ in Figure 6 are provided, which slides coact at their lower extremities with respective cams, such as shown at 34$^a$, which are mounted on a barb-actuating mechanism shaft 36 and 36$^a$. Springs 37—37$^a$ normally tend to press the pinch rolls into feeding engagement with the barb stock and the cams 34 lift the upper rolls 29—29$^a$ when the feed is to be interrupted.

The drive for the pinch rolls is transmitted from skew gears 38 and 38$^a$ mounted on shafts 36 and 36$^a$ and meshed to mating gears 40 and 40$^a$ mounted on shafts 42 and 42$^a$ to which are secured sprockets 44 and 44$^a$. These sprockets in turn transmit motion through sprocket chains 46 and 46$^a$ to sprockets 48 and 48$^a$ secured to the shafts 50 and 50$^a$ on which the lower pinch rolls 28 and 28$^a$ are mounted. As thus arranged it will be apparent that the lower pinch rolls 28 and 28$^a$ can be constantly driven and yet an intermittent feed can be imparted to the barb stock due to the periodic lifting and lowering of the upper pinch rolls effected by the cams 34 and 34$^a$.

The gear sectors 24 and 24$^a$ which rotate the coiler turrets, are actuated from the shafts 36 and 36ᵃ by cranks such as indicated at 52 in Figure 6, these cranks being connected to suitable pitmans, such as indicated at 54, with crank pins such as indicated at 56. It will be understood that the barb coiling mechanism on opposite sides of the center line of the machine of Figure 7 are substantial duplicates of one another, as are also the pinch roll devices for feeding the stock thereto.

Figure 5:
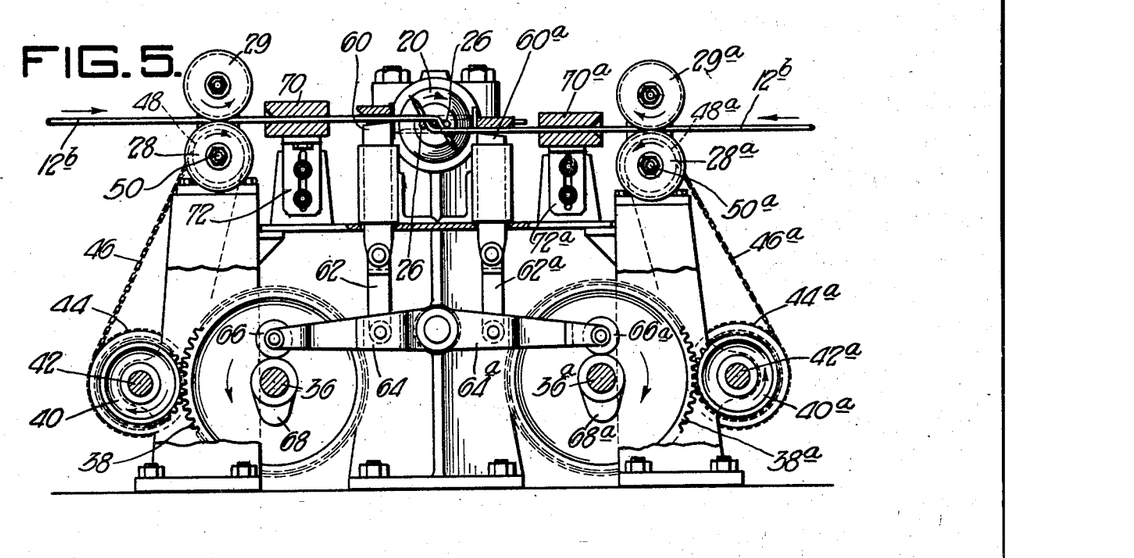
Figure 5 is a transverse vertical section illustrating barb applying mechanism, the view being taken on line V—V of Figure 2.

The pinch rolls are effective to periodically advance wire stock transversely across the path of travel of the longitudinally advancing line wires until the end of the barb stock strikes fixed gauge abutments 58 and 58ᵃ. Thereafter the pins 26 and 26ᵃ rotating with the turrets are effective to coil the free ends of the barb stock around the advancing line wire. After a predetermined number of coils have been made, movable knives 60 and 60ᵃ are reciprocated vertically in guides, such as shown in Figure 5, by means of links 62 and 62ᵃ connected to levers 64 and 64ᵃ whose outer extremities carry rollers 66 and 66ᵃ which coact with cams 68 and 68ᵃ carried by the aforesaid shafts 36 and 36ᵃ.

The free end of the barb stock while en route moves up to the fixed gauge abutments 58 and 58ᵃ from its previous cutting position, said stock being directed to guide sleeves 70 and 70ᵃ carried by the vertically adjustable brackets 72 and 72ᵃ.

The fixed abutments 58 and 58ᵃ are adapted to be adjustable for a desired length of barb after the twisting thereof is completed. In the normal operation of the machine, therefore, the gauge abutment is fixed; thus as the barb stock is fed forward it strikes the gauge abutment whereupon the feed rolls slip on the barb stock thus preventing further feeding thereof until the stock is cut, which cutting provides a new free end to be subsequently fed up to the abutment to form the next barb.

During the time the barb stock is being coiled about the advancing strand wires, the barb-applying mechanism is also advancing at a rate commensurate with the longitudinal travel of the strand wires. This longitudinal movement of the barb-applying mechanism is effected by a race cam 74 which is shown in Figure 1, which cam is secured to shaft 36ᵃ. The cam 74 serves to rock a lever 76 about its vertical pivot 78 so as to thus transmit longitudinal motion to the grooved collar 80 secured to the left extremity of the barb coiling turret as shown in Figure 1, the end of the lever 76 remote from the cam carrying a roller 82 which operates in the groove of the collar 80. As thus arranged it is apparent that reciprocating motions can be imparted to the barb coiling turrets so as to thus permit the winding operation to keep pace with the travel of the advancing strand wires. It will be understood that when the coiling turret advances longitudinally there will be a relative longitudinal slippage between the gear sectors 24—24ᵃ and the gears 22—22ᵃ meshing therewith. The barb stock will, of course, be slightly flexed under influence of the advancing movement of the coiling turrets.

The drive for the barb actuator shafts 36 and 36ᵃ is through bevel gears 84 and 84ᵃ meshing with similar gears 86 and 86ᵃ secured to an auxiliary cross shaft 88. The shaft 88 in the machine of Figure 1 carries at its lower extremity a spur gear 90 which meshes with a spur gear 92 driven from shaft 94 through suitable gear reduction from the main drive motor 96.

In the machine of Figure 7 the drive for the shafts 36 and 36ᵃ is somewhat similar except that the gear is located on the opposite side of the frame. In Figure 7 the gear 90ᵃ meshes with the gear 92ᵃ secured to the outer end of the shaft 94 which can be considered as an extension of the same shaft 94 shown in Figure 1. This shaft 94 constitutes the main drive shaft of the machine and it carries a drum 98 which is equipped with a multiplicity of transversely slidable bars 100, each of which carries a rack 102 meshing with a slotted twister gear 104 such as shown in Figures 3 and 4. The adjacent slidable bars 100 are adapted to impart reverse twists to adjacent spaced portions of the line wires in a manner to be hereinafter more fully explained. At their outer extremities the bars 100 carry rollers 106 and 106ᵃ which ride on respective cam faces 108 and 108ᵃ of annular cams which are fixedly secured to frame members 110. Located concentrically with the fixed cam members having the faces 108 and 108ᵃ, there are other fixed cam members having faces 112 and 112ᵃ. The parts are so constructed and arranged, as will be apparent from Figures 1 and 7, that the roller on every alternate slidable bar coacts with the cam faces 108 and 108ᵃ of the outer fixed cam while the rollers of the intermediate bars coact with the cam faces 112 and 112ᵃ of the inner fixed cams. Differently expressed, the rollers on the adjacent transversely movable rack bars coact respectively with the outer and inner cam faces of the concentrically arranged fixed cams.

This alternate arrangement of the rack bars and the nesting of the reversely arranged cams is an important and essential feature of the basic design of the present machine since it provides the means whereby the substantially parallel strands may be gripped at spaced points and have opposite twisting motions applied thereto, these opposite twisting motions being simultaneously applied at spaced points lengthwise of the strand material which is engaged by a plurality of the twister gears which are circularly disposed at different angular positions around the periphery of the drum 98. This desirable arrangement makes it possible to grip the strand wires at points midway between the barbs so as to produce the reversely twisted product such as shown in Figures 10 and 12. From examination of these figures it will be apparent that the portions indicated by A have a right-hand lay or twist therein while the portions indicated at B and B' have left-hand lay or twists imparted thereto.

For properly effecting initial engagement between the strand wires and the twister gears of the drum with which they first come into cooperation, special means are provided. This special means includes oscillating sheaves 114 and 114ᵃ. These sheaves are periodically raised and lowered, for example, from the full line to the dotted line position of Figure 2.

Figure 13:
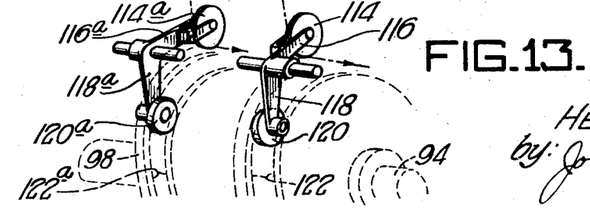
Figure 13 is a detail view of mechanism for elevating and lowering oscillating sheaves for effecting proper engagement between the line wires and the twister gears.

As shown in Figure 13, the oscillating sheaves 114 and 114ᵃ are mounted on respective levers 116 and 116ᵃ having depending arms 118 and 118ᵃ carrying rollers 120 and 120ᵃ which ride in race cam grooves 122 and 122ᵃ formed in the opposite faces of the rotary drum 98.

As thus arranged, the oscillating rollers are effective to force the line wires down into the specially shaped slots in the twister gears. These twister gears, as shown in Figure 4, are specially formed so as to crowd the line wires together during the twisting operation. This crowding is made possible by making the slots in the twister gears of a width equal to about one and one-half times the diameter of the individual line wires. The action is improved by converging the lower portions of the slot as indicated at 117 to the base portion 119, which portion is curved on a radius approximately equal to the radius of the line wire. This detail of construction provides means whereby the wires, in attempting to crowd down into the converging space, are brought tightly into contacting position. This differs from prior twisting arrangements wherein the adjacent wires usually have a space between them. By my improved construction I secure a more tightly twisted barbwire product.

In the modified slot formed in the twister gear, the width of the slot is increased over the conventional slot width to about one and one-half times the diameter of one wire, which allows for providing a cam shaped slot side, starting above the wire contact point of a conventional gear and extending down to the bottom of the slot having the width of a conventional gear. Wires being twisted in slots thus formed or shaped have a tendency to pass one another during the twisting action, although in reality they cannot pass since the slot is narrower than the two wires. However, in the attempt to pass the wires are brought into firm contact with one another, as illustrated in Figure 4.

The fixed cams which actuate the twister gear rack bars are so constructed and arranged that what I term an overtwist is imparted to the line wires. At the completion of any number of even turns of a given twister gear, as predetermined, its actuating rack 102 has a stroke imparted thereto by its respective cam of sufficient length to turn the gear slot a predetermined number of degrees beyond that required to impart a given number of even turns. The cams are designed to permit the rack to recede directly after this overtwisting operation. This finally positions the gear slot in register with the position it would normally occupy after a predetermined number of turns have been imparted thereto. In short, an overtwist is imparted to the wire and this is followed by a reverse or backward motion of the gear. The purpose of this is to compensate for the inherent elasticity of the stock or strand wire. The advantage of such overtwisting operation relieves the pressure between the twisted wires and the side walls of the twister slot and thus facilitates the eventual stripping of the twisted wire from the slots of the twister gears. Thus it will be apparent that by imparting the overtwist movement and permitting the gears to return to a predetermined position, objectionable binding of the wire in the twister gears is prevented and a smoother stripping operation is made possible.

Means are provided for distorting the strand wires from their natural straight line position from one twister head to the other. As shown in Figure 2, I provide a rotary member 124 provided with a plurality of jaws 126, each of which is slotted as indicated at 128 to provide projections which straddle the barbs carried by the line wires. The member 124 is carried by a shaft 130 to the outer end of which is secured a gear 132 which meshes with and is driven by the gear 92 in the arrangement of Figure 1. In the arrangement of Figure 7 the gear 132 meshes with and is driven by the gear 92a. As the member 124 rotates the jaws 126 will deflect the line or strand wires downwardly as shown in Figure 2, at which time the slot 128 will straddle the barbs so as not to interfere. The downward deflection or distortion of the wire takes place between the locking point of a forward twister gear and the start or twisting point of the following gear, and the distortion continues until the following gear has reached the position of the preceding gear and its locking point. As thus arranged, an adequate amount of surplus wire is locked between each two sets of twister heads and this surplus wire is spent or taken up as the twister heads complete the predetermined number of twists in the line wires.

With the mechanism arranged as shown and described, it will be apparent that as the drum 98 rotates, certain of the operating rack bars will impart right-hand twists to their associated twister gear and other rack bars will impart left-hand twists to their associated gears. Thus adjacent portions of the completed barbwire will have reverse twists simultaneously imparted thereto so as to produce the reverse twist barbwire such as shown in Figures 10 and 12.

These reverse twisting operations take place during a time interval corresponding to approximately one-half revolution of the twister drum 98. As the respective twister gears carried by the drum reach the bottom position, take-off means to be now described in cooperation with the rotation of the drum is effective to disengage the twisted wire from the slots in the twister gears and to carry off the completed barbwire product. In this connection it is to be remembered that the overtwist and the reverse relieving movement facilitates the eventual stripping of the product from the slots in the twister gears.

The pull-out mechanism includes rolls 134, 136 and 138 carried on respective shafts 140, 142 and 144. These rolls are each provided on their peripheries with suitable recesses into which the barbs extend as the feed-out rollers rotate. The feed-out rollers may conveniently be driven as indicated in Figures 1 and 2 by a sprocket 146 connected by a sprocket chain 148 to a sprocket 150 carried by the shaft 142. The shaft 142 also carries a spur gear 152 (Figure 1) which meshes with a gear 154 secured to the shaft 144 which carries the pull-out roll 138. The roll 134 carried by the shaft 140 is an idler or guide roll.

Means to be later more fully described are provided for accumulating predetermined lengths of completed barbwire alternately on two separate take-up reels marked 1 and 2, and a flying shear and related control means are effective to periodically cut the completed barbwire and alternately deflect the fabricated product either to take-up reel 1 or 2. This dual take-up mechanism is under control of a limit switch actuated by a counter which shows at all times the amount of completed wire on the working take-up reel. For example, barbwire is frequently sold in reels containing 80 rods of wire. Thus the machine may be designed for alternately accommodating 80 rod batches on each of the take-up reels 1 and 2. The counter is so related to the take-off mechanism that it will indicate to the operator at all times the amount of the completed product on a given reel. This is advantageous since it gives the operator advance notice so that he can be ready to take off the full reel and replace it with an empty reel. Thus the use of two reels facilitates continuous operation, since an empty reel can always be placed in the machine to receive the oncoming product before the full reel is removed.

Figure 20:
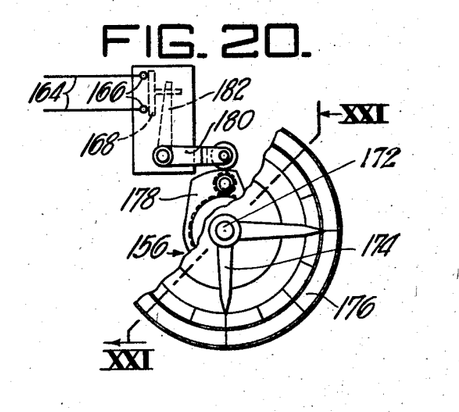
Figure 20 is a fragmentary detail of an indicator and mechanism controlled thereby for actuating a limit switch effective to control the operation of a one-revolution clutch and parts associated therewith.
Figure 21:
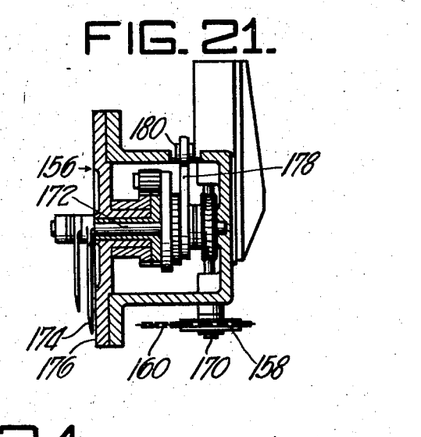
Figure 21 is a section on line XXI—XXI of Figure 20.
Figure 24:
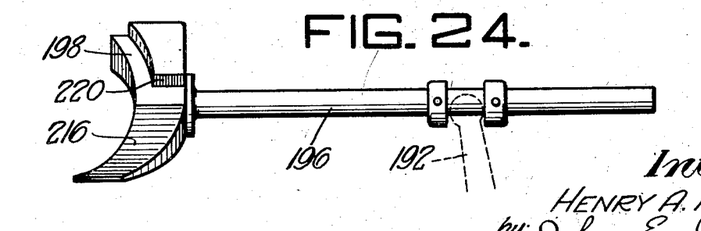
Figure 24 is a detail of a clutch operating rod.

The mechanism which makes this desired result possible is best shown in Figures 14 through 21. The control counter is indicated as a whole at 156 (Figures 20 and 21). It is driven by a sprocket 158 connected by a chain 160 trained over a sprocket 162 secured to the shaft 88. As thus arranged it is apparent that the counter is so synchronized with the movements of the rotor which carries the twister mechanism that after a predetermined length of completed barbwire has traversed the drum, said counter can be made effective to close an electric circuit after a predetermined amount of barbwire has been made and accumulated on the take-up reels.

In the embodiment of the invention illustrated, the counter closes a circuit through circuit wires, indicated at 164 in Figures 7 and 20. This circuit is normally open across contacts 166 of a limit switch shown in Figure 20, which includes a member 168 which in turn coacts with the contacts 166 to bridge the gap each time the counter registers the accumulation of a predetermined length of wire, for example, 80 rods. The counter includes a driving spindle 170 which transmits motion to a shaft 172 carrying a pointer 174, which traverses a suitably calibrated scale 176. The specific mechanism of the counter forms no part of the present invention. Suffice it to say that when a predetermined length of wire, for example, 80 rods, has accumulated on one take-up reel, a cam 178 secured to the shaft 172 of the counter will have made one complete revolution. Thus for each predetermined length of completed product the cam 178 will rock a lever 180 which is connected by an arm 182 with the switch element 168; thus for every 80 rods of wire accumulated on the active take-up reel, the circuit will be closed. This will energize a solenoid 184 which is connected in series with the circuit wires 164 above mentioned. Energization of the solenoid 184 lifts a slide 186 which carries a spring pressed dog 188 which coacts with an extension 190 on a trip lever 192 carried on a pivot stud 194. The trip lever 192 serves to actuate a slide rod 196 mounted in suitable guides and carrying on its inner extremity a clutch control cam plate 198. A spring 200 normally tends to hold the cam plate 198 in its inward position shown in Figure 15. The cam plate 198 controls the operation of a one-revolution clutch in such manner that when the plate is in the inward position of Figure 15, the clutch shaft 202 will turn freely without transmitting motion to the clutch member 204 which is loosely mounted on a sleeve 206 carried by the shaft 202. The clutch member 204 has slidably mounted therein a clutch pin 208 normally pressed toward the clutch plate 198 by a spring 210. When the plate 198 is retracted, the clutch pin 208 therefor is urged by the spring 210 toward a drive plate 212 keyed to the clutch shaft 202. This drive plate has four recesses 214 therein for quick engagement with the clutch pin 208. Thus, each time the counter 156 acting through the limit switch described causes the solenoid 184 to be energized, the cam plate 198 will be retracted, whereupon the clutch pin 208 will be engaged with one of the notches of the clutch drive plate 212. Thus the clutch member 204 and parts carried thereby will be driven through one revolution. At the completion of this single revolution, the clutch pin 208 will be retracted from the clutch drive plate 212 by the inclined face 216 formed on the cam plate 198. To prevent overrunning of the clutch member 204 the same is provided with a strike lug 218 which coacts with a stop shoulder 220 formed on the cam plate 198.

The clutch shaft 202 is driven constantly through a bevel gear 222 secured to the lower end thereof which meshes with a bevel pinion 224 secured to a pull-out shaft 226. The latter is driven through bevel gears 228 and 230. The gear 230 is secured to a jack shaft 232 carrying a sprocket 233 which is connected by a chain 234 to a sprocket wheel 236 carried on an upper jack shaft 238 which latter is driven by a chain 240 trained over a sprocket 242 (Figure 7) secured to the rotor shaft 94. Thus it is apparent that the vertical clutch shaft 202 can be periodically caused to impart one revolution to the clutch member 204 at predetermined regular intervals after a desired amount of the completed product has been accumulated on either of the take-up reels 1 or 2.

A flying shear 244 (see Figures 14 and 19) is provided which serves the double function of cutting the wire after each predetermined batch has been accumulated on each take-up reel and guiding the wire to one or the other of the take-up reels 1 and 2. This combined flying shear and guide is mounted on an upright stub shaft 246 (Figure 14ª) journaled in a slide 248 mounted in suitable fixed guides 250. The slide has depending therefrom a pin 252 which is connected by a pitman 254 with a crank pin 256 carried by a disc 258 which is secured to and therefore moves with the clutch member 204. Fixed on the lower end of the stub shaft 246 which carries the combined flying shear and guide, there is a double armed lever 260 which is connected by respective links 262 and 264 to levers 266 and 268 pivoted at 270 and 272. These levers carry respective cam rollers 274 and 276 which coact with cams 278 and 280 secured to respective upright side shafts 282 and 284. These shafts carry gears 286 and 288, both of which mesh with a gear 290 secured to the crank disc 258 which is keyed to the clutch member 204.

The pitch diameter of the gear 286 is twice that of the gear 290. This ratio is also true with respect to the gear 288. Because of this two-to-one gear ratio it is clear that the side shafts 282 and 284 and the cams 278 and 280 carried thereby will turn only one-half of a revolution while the clutch member 204 and the gear 290 moving in unison therewith turn one complete revolution. The flying shear actuating cams 278 and 280 are so designed and arranged that the cam 278 (associated with No. 2 take-up reel) operates the flying shear 244 while the dwell portion of cam 280 makes one-half of a revolution from the position shown in Figure 14. On the following cycle the cam 280 (associated with the No. 1 take-up reel) operates the flying shear 244 while the dwell portion of cam 278 makes one-half of a revolution.

It is apparent that the described mechanism provides a flying shear which is effective both to shear the wire and direct it selectively either to reel 1 or reel 2. During this action the flying shear guide travels along with the wire at the same speed at which it is advancing; that is, the wire is cut on the fly while moving longitudinally and is also shifted laterally after each cut so as to travel toward an empty reel. Thus, automatic means are provided for selectively directing the completed barbwire product to one or the other of the pair of take-up reels after a predetermined amount of such product has been accumulated on one of them.

It is deemed important to provide mechanism effective to cut the wire while it is traveling, since otherwise there is a tendency, as when using a stationary shear, to buckle the wire. To overcome this buckling in prior art machines, the wire was produced at a slower rate than that at which the mechanism constituting the present invention operates. In the described novel flying shear arrangement it will be noted that after the clutch shaft has turned the crank disc 258 ninety degrees, it will have moved the flying shear slide 248 forward a distance equal to one-half of its total stroke. During this time interval the shear cam 278 (associated with No. 2 reel) has moved only forty-five degrees. This is sufficient to cause the active portion 278ª thereof to impart the full stroke to the lever 266, which in turn imparts a full stroke to the double lever 260 which transmits a full stroke of the flying shear. The full stroke of the cam lever 266 is sufficient, however, to move the flying shear 244 through its complete stroke, plus the additional distance moved forward by the slide 248 on which the flying shear is pivoted. Thus the wire is cut free after the slide has moved forward only one-half of its total stroke. During the remaining half of the stroke forward the flying shear 244 remains dormant on the slide. In this dormant position, however, it functions as a guide to properly direct the free end of the wire to the No. 1 reel and the shear cam rollers 274 and 276 and levers 266 and 268 merely move forward away from the cams 278 and 280. During the return stroke of the shear slide 248 the flying shear 244 still retains its dormant position on the slide in which it guides the wire to the No. 1 reel and the cam rollers and levers return therewith to their normal position for coaction with their respective cams to remain in readiness for the next shearing cycle which will operate in an opposite manner, and at the completion of this cycle the shearing devices will occupy the positions illustrated in Figure 14, in which position the shear guide directs the product to the No. 2 reel.

A spring 292 is secured at one end of the double lever 260 and at its other end to a fixed anchorage 294. This spring therefore shifts past dead center as the double lever moves from one position to the other and thus serves to impositively lock said lever in its two extreme positions. Consequently the shear guide is impositively held in either of its two positions; thus the product is alternately positively guided to either the No. 2 or the No. 1 take-up reel.

Figure 14:
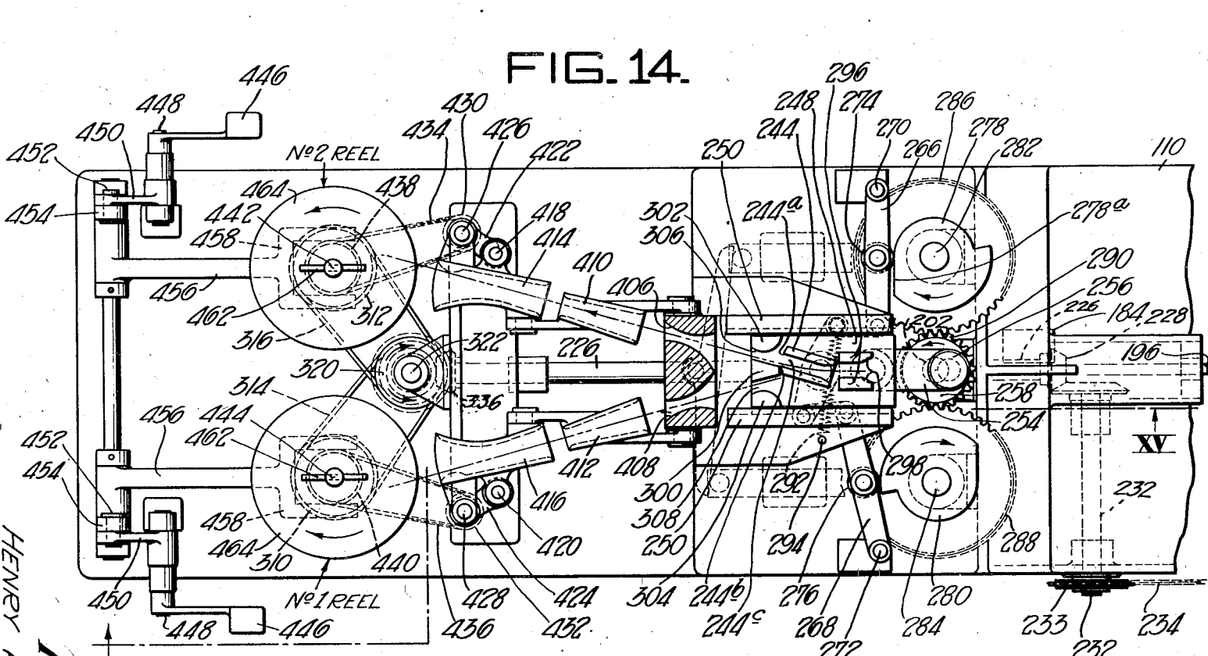
Figure 14 is an enlarged fragmentary plan view of the left end of Figure 7.
Figure 14A:
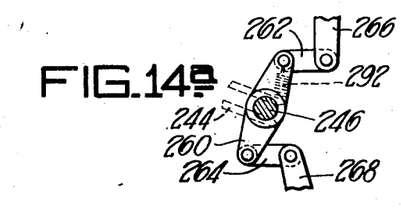

The flying shear 244 includes two elements having knife edges 244ª and 244ᵇ. These elements jointly define a guide passageway 244ᶜ. The slide 248 carries a pair of front guide blocks 296—296 which define a passageway 298. The flying shear coacts with a stationary blade 300 which is approximately triangular in plan view, as shown in Figure 14. Flanking this blade there are rear guide blocks 302 and 304 which jointly with the stationary blade define passageways 306 and 308. In one stage of operation the combined flying shear and movable guide 244 will direct the outgoing barbwire through the passageway 306 and thence to the No. 2 reel, and in another stage it will direct the outgoing product through the passageway 308 to the No. 1 reel.

On the outgoing side of the flying shear (to the left in Figures 14 and 15) is located improved take-up mechanism including the reels 1 and 2. These reels are selectively driven in a manner to be now described in such a way that the driving connection to the empty reel is inactive while the working reel is accumulating stock thereon. However, when the working reel becomes filled to a predetermined capacity (80 rods of wire in the example given) the driving connection to the full reel is broken and then a driving connection is established to the empty reel. This is a desirable function in a machine of the character disclosed because there is always a reel in readiness for the oncoming product and there need be no stopping of the machine while separate batches of material are being accumulated.

The reels 1 and 2 carry respective grooved drive pulleys 310 and 312. These are connected by respective belts 314 and 316 with pulleys 318 and 320 mounted on a vertical shaft 322. The pulleys 318 and 320 have incorporated in their hubs respective free wheeling clutches which permit each respective pulley to receive a driving torque from the shaft 322 when the same turns in one given direction and permits the pulley to slip relative to the shaft when the same turns in another given direction. The arrangement is such that when the shaft 322 is turned counterclockwise, reel 2 will also be turned counterclockwise, and when the shaft 322 is turned clockwise, reel 1 will likewise be turned clockwise. This function is secured by the utilization of the free wheeling clutches incorporated in the hubs of the pulleys 318 and 320, it being apparent that as thus arranged at a given time one pulley can be driven by the shaft 322 when it is turning in one direction while the other pulley slips relative to the shaft when it is turning in said direction. The free wheeling clutches for the respective pulleys 318 and 320 are indicated at 324 and 326 in detail in Figure 16. They are of the conventional one-way roller and cam wedge type and therefore need not be shown in detail.

Figure 15:
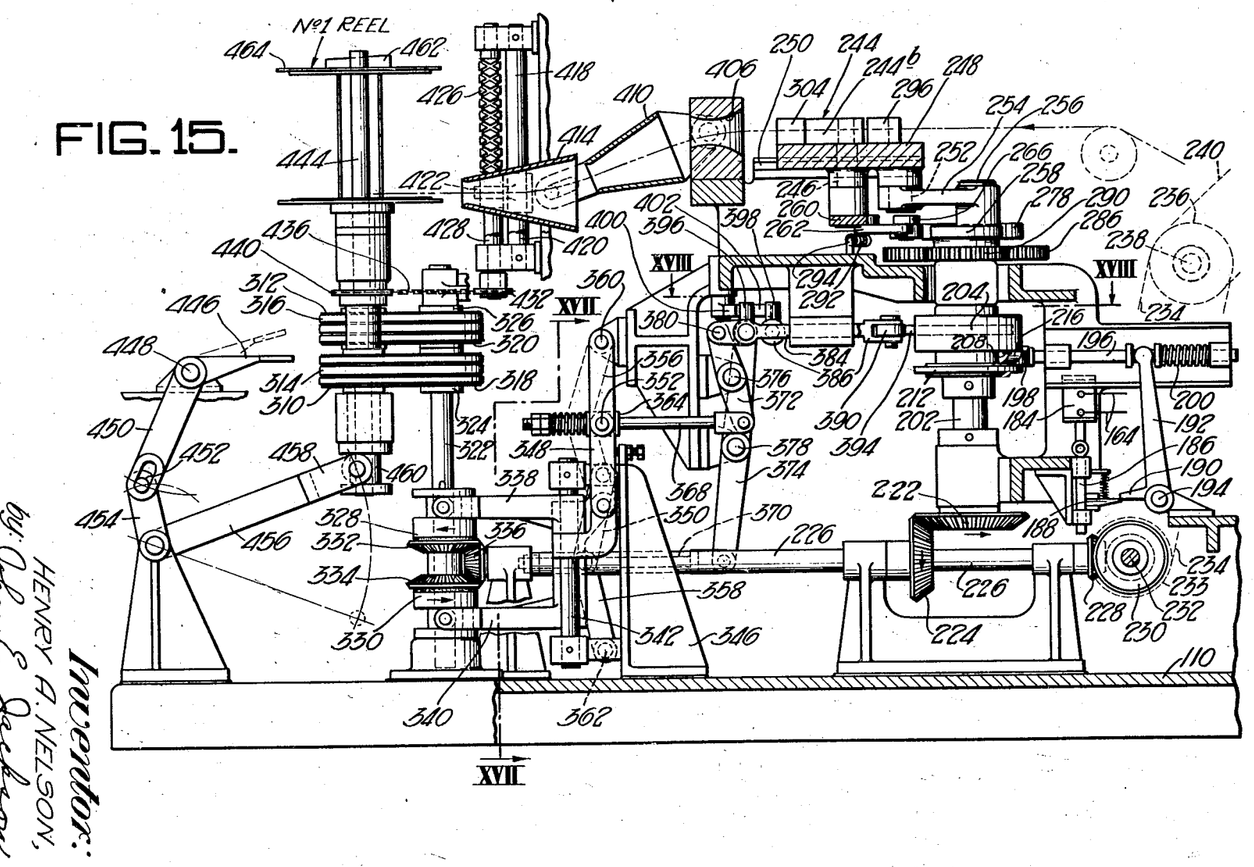
Figure 15 a sectional elevation of the parts shown in Figure 14, the view being approximately taken on line XV—XV of Figure 14.
Figure 16:
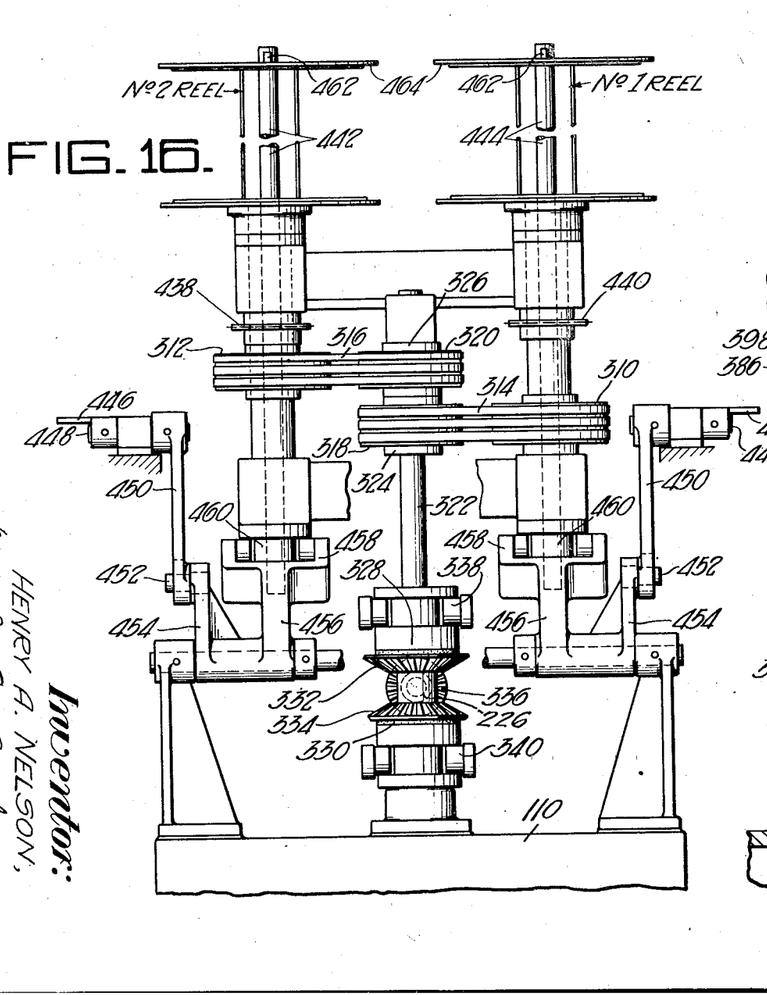
Figure 16 is an elevation as viewed from the left of Figure 15.
Figure 17:
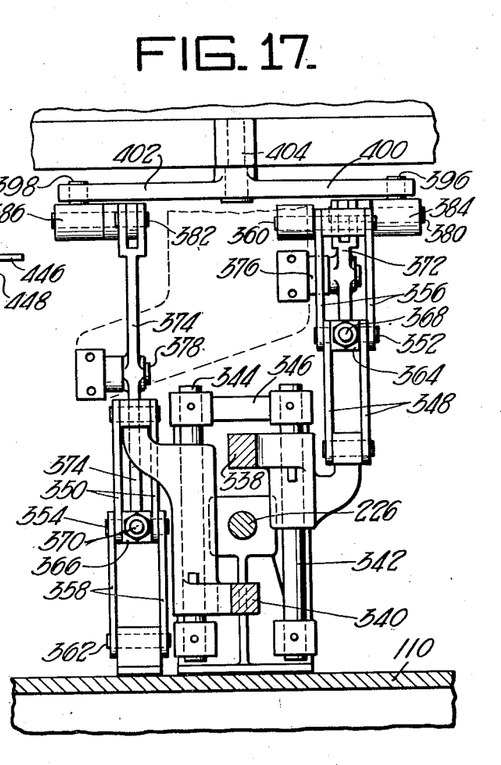
Figure 17 is a vertical section on line XVII—XVII of Figure 15.
Figure 18:
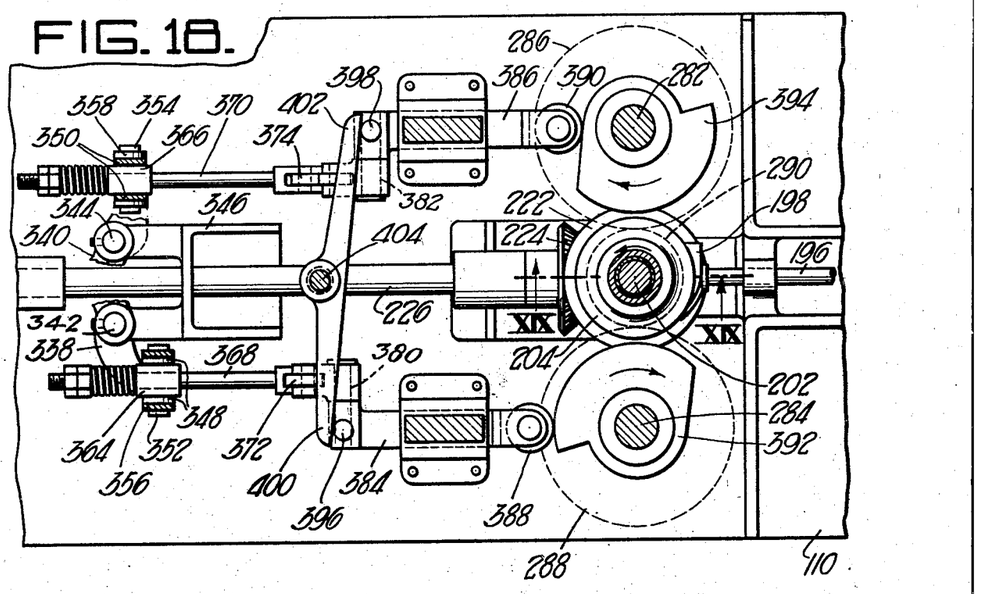
Figure 18 is a horizontal section on line XVIII—XVIII of Figure 15, illustrating the means for selectively controlling the delivery of wire to different take-up reels.
Figures 19, 22, 23:
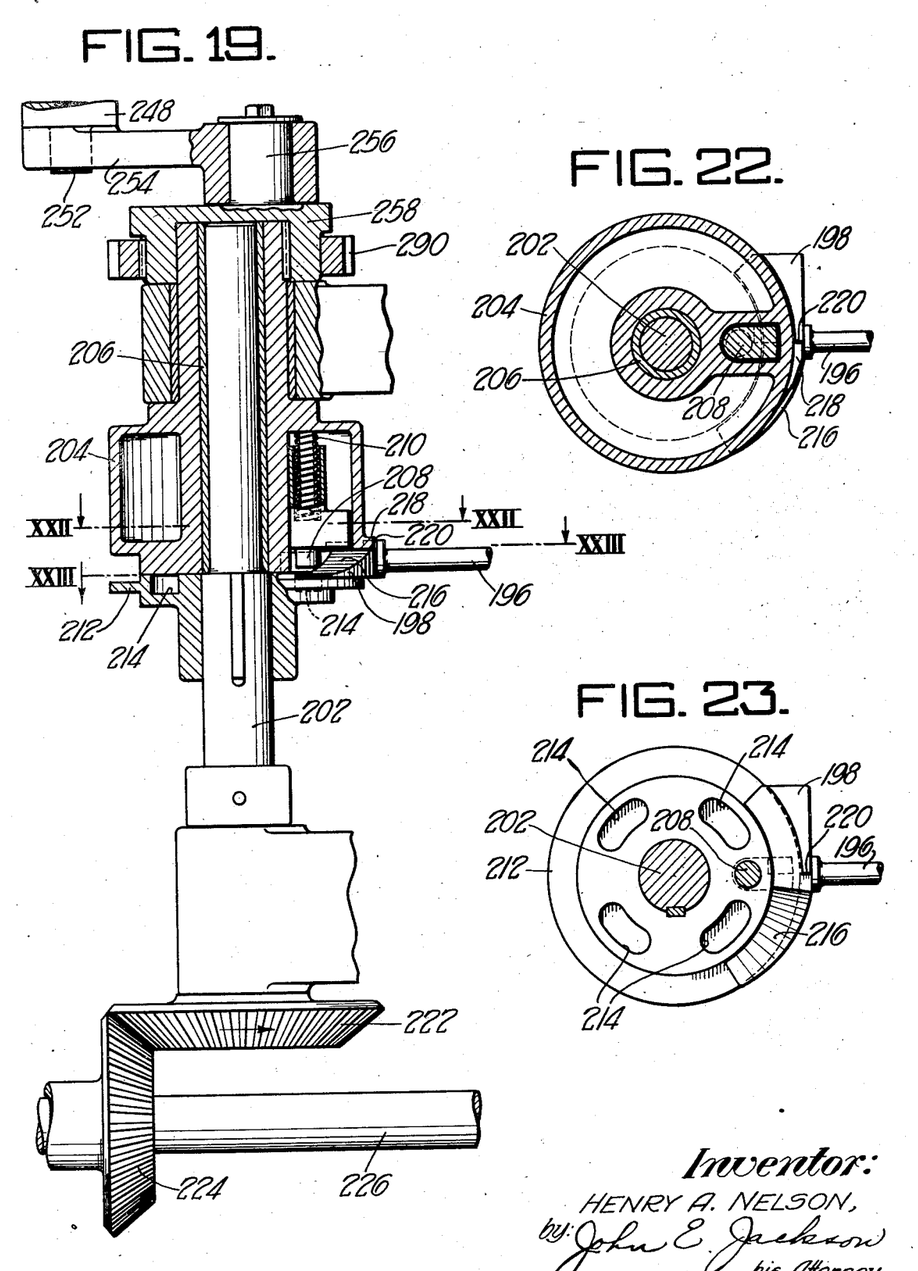
Figure 19 is a fragmentary vertical section taken approximately on line XIX—XIX of Figure 18 and chiefly illustrating a clutch shaft and parts driven thereby for actuating a flying shear and related parts.
Figure 22 is a sectional plan taken on line XXII—XXII of Figure 19.
Figure 23 is a sectional plan taken on line XXIII—XXIII of Figure 19.

For rotating the shaft 322 in either clockwise or counterclockwise direction, I provide friction clutches 328 and 330 coacting with respective bevel gears 332 and 334, both driven by the same bevel pinion 336 secured to the extremity of the aforesaid pull-out shaft 226. As thus arranged it is clear that the bevel gears 332 and 334 will be driven in opposite directions, as suggested by the arrows in Figure 15. The clutches 328 and 330 are alternately engaged with the gears 332 and 334 by means of respective actuating yokes 338 and 340, which are slidable vertically on fixed guide rods 342 and 344 (Figure 17) carried by a supporting bracket 346. As shown in Figures 15 and 17, yoke members 338 and 340 are connected with respective toggle links 348 and 350, these links being connected by pins 352 and 354 with companion toggle links 356 and 358 which are pivoted to respective dead end bearings 360 and 362. The toggle pins 352 and 354 are carried by toggle blocks 364 and 366 which are operatively connected with rods 368 and 370 in turn connected with toggle operating levers 372 and 374 mounted on respective fixed pivots 376 and 378. The levers 372 and 374 are connected by respective pins 380 and 382 with short links to respective slides 384 and 386 (Figure 18) which carry rollers 388 and 390 for coaction with respective cams 392 and 394 which are secured to the aforesaid side shafts 284 and 282. The slides 384 and 386 carry respective upstanding pins 396 and 398 which coact with fingers 400 and 402 of a toggle joint release lever pivoted midway between the slides on a fixed stud 404. As thus arranged the cams 392 and 394 are effective, in cooperation with the slides 384 and 386 and the fingers 400 and 402 of the toggle release lever, to shift the clutch operating toggle rods 368 and 370 in reverse directions so as to alternately or selectively engage either clutch 328 or 330. In other words, the toggle joint release lever is effective to kick out one toggle and kick in the other, thereby releasing one friction clutch on shaft 322 while the other clutch thereon is simultaneously engaged. Thus power is transmitted selectively first to one of the take-up reels and then to the other so that as soon as one reel is filled to capacity another can be immediately utilized to take up the product, thus enabling continuous operation and an increased output per machine.

As soon as the clutch pin engages the member 212, the flying shear operates to cut the barbwire and direct the free cut end thereof to an empty reel, at about the same time the reel drive control is actuated to automatically cut out the drive for the full reel and transfer the drive to the empty reel. These desirable functions are secured as a result of the coordination of the various parts of the mechanism set forth, it being deemed important to control the operation of selector mechanism such as the friction clutches on the shaft 322 by means of cams or equivalent motion transmission devices which operate in timed relation to movements of the flying shear. These devices are coordinated with the actuating means for the shear because of their interconnection with the constantly driven clutch shaft 202 and member 204 freely mounted thereon which is adapted to be operatively connected to said shaft at periodic intervals upon energization of the clutch control solenoid 184, it being remembered that this solenoid is energized each time its circuit is closed by the limit switch after a predetermined amount or batch of barbwire has been fabricated by the respective barb-applying and reverse strand twisting mechanisms and accumulated on either one of the two take-up reels.

The flying shear is designed, arranged and operated so that it will be effective at certain stages to guide the barbwire through passage 308, directing the product to reel No. 1. At other stages of operation the flying shear will guide the product through passage 306 so as to direct the wire to reel No. 2 (the position shown in Figure 14). When the wire reaches the passage 306 it will pass through a guide tunnel 406. Similarly, when the flying shear is in its other operative position, the wire will pass through a guide tunnel 408. Respective wire catchers 410 and 412 are pivotally mounted to receive the wire from the tunnels 406 and 408 and to deliver the wire to disnels 414 and 416, which are slidable on fixed guide rods 418 and 420. The distributors have respective depending portions which carry respective nuts 422 and 424 (Figures 14 and 15) for engagement with respective double threaded screw distributor shafts 426 and 428, these shafts carrying sprockets 430 and 432 which are connected by chains 434 and 436 driven by respective sprockets 438 and 440 (Figure 14) secured to the shafts 442 and 444 of the reels 2 and 1, respectively.

To provide for quick removal of either take-up reel 1 or 2 when filled to its desired capacity, I associate with each shaft 442 and 444 a foot treadle best shown in Figures 14 and 15. Each treadle 446 is pivoted on a shaft 448, and each is adapted to rock a toggle arm 450 which through a pin and slot connection 452 rocks an arm 454 which transmits movement to a lever 456, which through yoke 458, reciprocates a grooved collar 460 secured to the reel shaft. Slight pressure on the foot treadle 446 raises the corresponding reel shaft sufficient to release a key 462 located above the reel cover plate 464. Upon removal of the key 462 the foot lever is released, thus allowing the reel spindle to drop clear of the reel so as to thus permit removal of the accumulated bundle of wire. Then an empty reel is placed on the reel shaft and the spindle is raised, by pressure on the foot lever, and held in position to permit replacement of the key. Releasing the pressure on the foot lever allows the weight of the spindle to lock the key and cover plate of the reel together as a unit.

While I have described certain specific mechanism for performing the various functions set forth, it is not to be construed that I am limited thereto since various modifications and substitutions of equivalents may be made by those skilled in the art without departure from the invention as defined in the appended claims.

I claim:

1. In a machine for making barbwire, means for advancing a plurality of strands in juxtaposed relation, mechanism for automatically applying barbs to at least one of said strands at spaced intervals, and means coordinated with said mechanism for simultaneously twisting spaced portions of said juxtaposed strands in opposite directions so as to produce a balanced barbwire product in which the tendency of one portion to twist in one direction is negatived by the tendency of an adjacent portion to twist in the reverse direction.

2. In a machine for manufacturing barbwire, a plurality of supplies of strand material, automatic means for periodically advancing strands from said supplies in juxtaposed relation, mechanism coordinated with said last-named means for applying barbs to one strand at predetermined spaced intervals, means for applying barbs to another strand intermediate the barbs applied to the first mentioned strand, and respective means for simultaneously twisting said strands in reverse directions automatically at a plurality of spaced points intermediate the adjacent barbs.

3. In a machine for manufacturing barbwire, a plurality of supplies of strand material, means for advancing strands from said supplies in juxtaposed relation, mechanism for applying barbs to at least one of said strands at equally spaced points, and respective means for simultaneously twisting said strands in reverse directions automatically at points between said barbs so as to produce a balanced barbwire product in which the tendency of one portion to twist in one direction is negatived by the tendency of an adjacent portion to twist in the reverse direction.

4. In a machine for manufacturing barbwire, means for advancing a pair of strands in substantially parallel relation, mechanism for applying respective barbs to each of the strands at substantially equally spaced intervals, a plurality of groups of strand twisting members adapted to engage the juxtaposed strands at spaced points, mechanism for imparting a twisting motion in one direction to one group of twisting members, and mechanism for applying a twisting motion to another group of twisting members in the opposite direction whereby spaced portions of said strands are twisted in reverse directions.

5. In a machine for manufacturing barbwire, means for advancing a pair of strands in substantially parallel relation, means for applying respective barbs to each of the strands at substantially equally spaced intervals, a rotor carrying a plurality of twisting devices adapted to engage the strands at spaced points about midway between the barbs, and means for simultaneously turning one group of twisting devices in one direction and another group of twisting devices in the opposite direction.

6. In a machine for manufacturing barbwire, means for advancing a pair of strands in substantially parallel relation, means for applying respective barbs to each of the strands at substantially equally spaced intervals, a rotor carrying a plurality of twisting devices adapted to engage the strands at spaced points, slides for actuating said devices, respective complementary cams adjacent opposite ends of the rotor effective to simultaneously reciprocate a plurality of alternate ones of said slides in one direction and a plurality of intermediate slides in the opposite direction whereby said twisting devices are effective to simultaneously impart reverse twists to a plurality of adjacent sections of said strands.

7. In a machine for making barbwire, means for advancing a plurality of strands in juxtaposed relation, means for applying barbs to at least one of said strands, means for simultaneously twisting spaced portions of said juxtaposed strands in opposite directions, the latter means including a gear with a slot in the periphery thereof and which converges inwardly so as to cause the strands to be tightly wedged into contact, and means effective to first impart an overtwist to each strand in one direction and later a reverse twist to facilitate the stripping of the twisted strands from the converging slots of said gears.

8. In a machine for making barbwire, means for advancing a plurality of strands in juxtaposed relation, means for applying barbs to at least one of said strands, means for simultaneously twisting spaced portions of said juxtaposed strands in opposite directions, each twisting means including a gear with a slot in the periphery thereof and which converges inwardly so as to cause the strands to be tightly wedged into contact, a rotor carrying a plurality of longitudinally slidable rack bars for actuating said twister gears, and fixed cams adjacent opposite ends of the rotor effective upon rotation of the rotor to simultaneously move alternate rack bars in one direction and intermediate rack bars in the opposite direction to thus cause the twister gears to simultaneously twist the strands together in opposite directions at a plurality of spaced points.

9. In a machine for making barbwire, means for advancing a plurality of strands in juxtaposed relation, means for applying barbs to at least one of said strands, means for simultaneously twisting spaced portions of said juxtaposed strands in opposite directions comprising a rotor carrying a plurality of longitudinally slidable rack bars and twister gears actuated thereby, each gear having a slot for engagement with said strands, and fixed cams adjacent opposite ends of the rotor effective upon rotation of the rotor to simultaneously move alternate rack bars in one direction and intermediate rack bars in the opposite direction to thus cause the twister gears to simultaneously twist the strands together in opposite directions at a plurality of spaced points, the inner ends of the slots in said twister gears converging inwardly so as to cause the strands to be tightly wedged into contact, said cams being shaped to first impart an overtwist to each strand in one direction and later a reverse twist to facilitate the stripping of twisted strands from the converging slots in said gears.

10. In a machine for making barbwire, a pair of supplies of strand wire, means for applying barbs to at least one strand wire, means for simultaneously twisting the strand wires together in reverse directions at a plurality of spaced intervals, a pair of take-up reels each adapted to advance the strands to the twisting means and withdraw the twisted product therefrom, a power drive common to both reels, and means for automatically disconnecting one of the take-up reels from said power drive after a predetermined amount of barbwire has accumulated thereon and at the same time connecting the other reel with said power drive.

11. In a machine for making barbwire, a pair of supplies of strand wire, means for applying barbs to at least one strand wire, means for simultaneously twisting the strand wires together in reverse directions at a plurality of spaced intervals, a pair of take-up reels each adapted to advance the strands to the twisting means and withdraw the twisted product therefrom, and combined shear and guide means effective to cut the twisted barbwire product after a predetermined amount thereof has accumulated on one take-up reel and to direct the oncoming product to the other reel.

12. In a machine for making barbwire, a pair of supplies of strand wire, means for applying barbs to at least one strand wire, means for simultaneously twisting the strand wires together in reverse directions at a plurality of spaced intervals, a pair of take-up reels adapted to alternately receive the twisted product, a flying shear having a guide portion, and means for automatically shifting the shear to sever the barbwire product after a predetermined amount thereof has accumulated on one of said take-up reels and to direct the oncoming product to the other take-up reel.

13. In a machine of the class described, means for advancing juxtaposed strands, means for applying barbs to at least one of said strands, means for twisting the strands together, a pair of take-up reels, and a flying shear effective to sever the barbwire product after a predetermined amount thereof has accumulated on one of said take-up reels and to direct the oncoming product to the other take-up reel.

14. In a machine of the class described, means for advancing juxtaposed strands, means for applying barbs to at least one of said strands, means for twisting the strands together, a pair of take-up reels adapted to alternately withdraw the twisted product, a member movable in the direction of travel of the product being withdrawn, and a shear carried by said member for cutting the moving product while it is being withdrawn.

15. In a machine of the class described, means for advancing juxtaposed strands, means for applying barbs to at least one of said strands, means for twisting the strands together, a pair of take-up reels adapted to alternately withdraw the twisted product, a member movable in the direction of travel of the product being withdrawn, a blade fixed on said member, and a flying shear pivoted on said member for coaction with said blade for cutting the product being withdrawn, said shear having guide portions effective to periodically direct the product alternately to each of said reels.

16. In a machine of the character described, means for twisting together a plurality of strands, a pair of take-up reels adapted to alternately receive the twisted product and a combined shear and guide effective to cut the product and direct it to either of said reels, and means automatically operable after a predetermined amount of product has been taken up by one reel for actuating said combined shear and guide whereby after such predetermined amount of the product has accumulated on one take-up reel the product is severed by said combined shear and guide and then directed to the other reel.

17. In a machine of the character described, means for twisting together a plurality of strands, a pair of reels adapted to alternately take up the twisted product, a slide movable in the direction of travel of the outgoing product, a blade and spaced guide blocks fixedly secured to said slide, a shear moving with the slide and also movable relative to said blade to sever the product, said shear having guide portions adapted to coact with said guide blocks to direct the twisted product alternately to each of said reels, and means responsive to the amount of product accumulated on either one of said reels for operating said shear to thus cut the product and direct it to the other reel.

18. In a machine of the character described, means for twisting together a plurality of strands, a pair of reels adapted to alternately take up the twisted product, a slide movable in the direction of travel of the outgoing product, a flying shear pivotally mounted on said slide, a blade substantially V-shape in plan secured to said slide, spaced guide blocks secured to the slide, said blade and blocks jointly defining passageways diverging from the shear, a fixed member with respective diverging guide tunnels therein to receive the product from the respective guides formed by the blade and said blocks, a respective pivotally mounted wire catcher juxtaposed to each of said tunnels, a respective distributor operatively connected with each catcher, and respective means for traversing each distributor in reverse directions across the face of each take-up reel.

19. In a machine for making barbwire, means for advancing a plurality of strands in juxtaposed relation, means for applying barbs to at least one of said strands, means for simultaneously twisting spaced portions of said juxtaposed strands together, a slide carrying a pivotally mounted flying shear equipped with guide portions, a blade and spaced blocks mounted on the slide and defining two guide passages, a fixed member having guide tunnels therein to receive the twisted product from said guide passages, and means for shifting the flying shear about its pivot so as to sever the product and change the direction of travel of the same therethrough and direct it through one of the guides formed by said blade and blocks.

20. In a machine for making barbwire, means for advancing a plurality of strands in juxtaposed relation, means for applying barbs to at least one of said strands, means for simultaneously twisting together spaced portions of said juxtaposed strands, the advancing means constituting a pair of take-up reels, a constantly rotating power drive, means for severing the completed product after a predetermined amount thereof has been accumulated on one of said reels, and means synchronized with the operation of said severing means for selectively connecting first one and then the other of said take-up reels with said power drive, said severing means having guide portions effective to direct the product alternately to each of said reels.

21. In a machine for making barbwire, means for advancing a plurality of strands in juxtaposed relation, means for applying barbs to at least one of said strands, means for simultaneously twisting together spaced portions of said juxtaposed strands, the advancing means constituting a pair of take-up reels, a constantly rotating power drive, respective shafts supporting said reels, means for selectively connecting either of said take-up reel shafts with said power drive, and respective treadles for shifting said reels longitudinally of said shafts to facilitate the removal of a full reel and placement of an empty reel.

22. In a machine for making barbwire, means for advancing a plurality of strands in juxtaposed relation, means for applying barbs to at least one of said strands, means for simultaneously twisting together spaced portions of said juxtaposed strands, the advancing means constituting a pair of take-up reels, a constantly rotating power drive, a clutch shaft constantly driven thereby, a one-revolution clutch member freely mounted on the clutch shaft and carrying a clutch pin, a cam plate controlling the operative relation of said pin to said constantly driven shaft, means responsive to accumulation of a predetermined amount of barbwire product on one of said reels for actuating said clutch cam plate, a flying shear having a guide incorporated therein, means driven from said clutch member operating the flying shear, respective selector clutches for controlling the transmission of motion from said power drive to each of said take-up reels, means controlled by said one-revolution clutch member for operating a selector clutch associated with each of said take-up reels whereby after a predetermined amount of stock has accumulated on one reel, the power drive is disconnected therefrom and connected with the other reel, means controlled by said one-revolution clutch member for alternately shifting the position of the flying shear so as to direct the wire product first to one and then to the other take-up reel, and respective means controlled by said one-revolution clutch member for alternately actuating each of said selector clutches.

HENRY A. NELSON.